(12) United States Patent
Sivakumar et al.

(10) Patent No.: US 9,621,384 B2
(45) Date of Patent: Apr. 11, 2017

(54) SYSTEMS AND METHODS FOR COMMUNICATING DATA OVER PARALLEL DATA PATHS

(75) Inventors: Raghupathy Sivakumar, Atlanta, GA (US); Hung-Yun Hsieh, Changhua (TW)

(73) Assignee: Georgia Tech Research Corporation, Atlanta, GA (US)

(*) Notice: Subject to any disclaimer, the term of this patent is extended or adjusted under 35 U.S.C. 154(b) by 2105 days.

(21) Appl. No.: 11/063,284

(22) Filed: Feb. 22, 2005

(65) Prior Publication Data

US 2005/0185621 A1 Aug. 25, 2005

Related U.S. Application Data

(60) Provisional application No. 60/546,034, filed on Feb. 19, 2004.

(51) Int. Cl.
| | | |
|---|---|---|
| *H04L 1/16* | (2006.01) | |
| *H04L 1/18* | (2006.01) | |
| *H04L 25/14* | (2006.01) | |
| *H04L 12/707* | (2013.01) | |
| *H04L 12/807* | (2013.01) | |

(52) U.S. Cl.
CPC ............ *H04L 25/14* (2013.01); *H04L 1/1887* (2013.01); *H04L 45/24* (2013.01); *H04L 47/27* (2013.01); *H04L 1/1607* (2013.01)

(58) Field of Classification Search
None
See application file for complete search history.

(56) References Cited

U.S. PATENT DOCUMENTS

| | | | |
|---|---|---|---|
| 4,740,954 A | 4/1988 | Cotton et al. | 370/60 |
| 5,065,396 A | 11/1991 | Castellano et al. | 370/84 |
| 5,446,738 A | 8/1995 | Kim et al. | 370/94.2 |
| 5,598,408 A * | 1/1997 | Nickolls et al. | 370/351 |
| 5,608,733 A | 3/1997 | Vallee et al. | 370/394 |
| 5,617,417 A | 4/1997 | Sathe et al. | 370/394 |
| 5,712,854 A | 1/1998 | Dieudonne et al. | 370/536 |
| 5,875,192 A | 2/1999 | Cam et al. | 370/474 |
| 6,097,703 A * | 8/2000 | Larsen et al. | 370/254 |
| 6,101,543 A * | 8/2000 | Alden et al. | 709/229 |
| 6,134,246 A | 10/2000 | Cai et al. | 370/474 |
| 6,594,238 B1 | 7/2003 | Wallentin et al. | |

(Continued)

OTHER PUBLICATIONS

Microsoft, Microsoft computer dictionary, 2002, Microsoft, fifth edition, p. 394.*

(Continued)

*Primary Examiner* — Alpus H Hsu
*Assistant Examiner* — Hooman Houshmand
(74) *Attorney, Agent, or Firm* — Ballard Spahr LLP

(57) ABSTRACT

Systems and methods for the communication of data over a plurality of parallel communication paths are provided. Embodiments of the parallel communications systems and methods may discover, characterize, and leverage multiplicity of resources in various network elements to provide network applications with a desired communication objective and level of performance. The systems and methods may dynamically adapt to changes in the network resources to continuously provide the desired communication performance.

38 Claims, 4 Drawing Sheets

(56) References Cited

U.S. PATENT DOCUMENTS

| | | | |
|---|---|---|---|
| 6,625,161 B1 | 9/2003 | Su et al. | 370/415 |
| 6,839,862 B2 | 1/2005 | Evoy et al. | 713/503 |
| 6,842,446 B2 | 1/2005 | Everson et al. | 370/349 |
| 7,082,101 B2* | 7/2006 | Kim et al. | 370/225 |
| 7,151,775 B1* | 12/2006 | Renwick et al. | 370/400 |
| 2002/0061022 A1* | 5/2002 | Allen et al. | 370/392 |
| 2002/0064149 A1* | 5/2002 | Elliott et al. | 370/352 |
| 2002/0085553 A1* | 7/2002 | Ku et al. | 370/389 |
| 2002/0120672 A1 | 8/2002 | Butt et al. | |
| 2002/0159410 A1* | 10/2002 | Odenwalder et al. | 370/329 |
| 2002/0161892 A1 | 10/2002 | Partridge | 709/226 |
| 2002/0161905 A1* | 10/2002 | Haverinen et al. | 709/229 |
| 2002/0186660 A1 | 12/2002 | Bahadiroglu | |
| 2002/0191576 A1* | 12/2002 | Inoue et al. | 370/338 |
| 2003/0026267 A1* | 2/2003 | Oberman et al. | 370/397 |
| 2003/0048792 A1* | 3/2003 | Xu et al. | 370/400 |
| 2003/0174654 A1* | 9/2003 | Tateson et al. | 370/238 |
| 2003/0198207 A1* | 10/2003 | Lee et al. | 370/337 |
| 2004/0170125 A1* | 9/2004 | O'Neill | 370/230 |
| 2005/0088977 A1* | 4/2005 | Roch et al. | 370/254 |
| 2006/0203719 A1* | 9/2006 | Kim et al. | 370/227 |
| 2006/0215592 A1* | 9/2006 | Tomoe et al. | 370/315 |
| 2009/0271626 A1* | 10/2009 | Wang | 713/170 |

OTHER PUBLICATIONS

Hsieh, et al., "A Transport Layer Approach for Achieving Aggregate Bandwidths on Multi-homed Mobile Hosts," School of Electrical Engineering, Georgia Institute of Technology, Atlanta, GA.

Adiseshu, et al., "A Reliable and Scalable Striping Protocol," Department of Computer Science, Washington University, St. Louis, MO.

Hsieh et al. A transport layer approach for achieving aggregate bandwidths on multi-homed mobile hosts. In *Proceedings of the 8th annual international conference on Mobile computing and networking* (MobiCom '02). 2002;83-94.

Hsieh et al. A Transport Layer Approach for Achieving Aggregate Bandwidths on Multi-homed Mobile Hosts. *ACM/Kluwer Wireless Networks Journal* (WINET), Jan. 2005, pp. 99-114, vol. 11, No. 1.

* cited by examiner

SYSTEMS AND METHODS FOR COMMUNICATING DATA OVER PARALLEL DATA PATHS

CROSS REFERENCE TO RELATED APPLICATIONS

This application claims priority to and benefit of U.S. Provisional Patent Application entitled "Approaches to Dynamically Discover, Characterize, and Aggregate Parallel Resources In Communication Systems," assigned Ser. No. 60/546,034, and filed on Feb. 19, 2004, which is incorporated by reference in its entirety.

GOVERNMENT SUPPORT CLAUSE

This invention was made with U.S. Government support under agreement number ANI-0117840, awarded by the National Science Foundation. The Government has certain rights in this invention.

TECHNICAL FIELD

The invention relates generally to systems and methods for data communication, and more particularly, to systems and methods for the communication of data over a plurality of parallel data communication paths.

BACKGROUND

Given the pivotal role that packet based data networks, such as the Internet, are envisioned to play in the future, a tremendous amount of research has been directed toward these networks to work better, cheaper, and faster. However, despite the vast resources of most networks, the majority communicate data between two network entities in a sequential manner. For example, the widely used Internet Protocol (IP) supports only single-path routing between any two entities.

Accordingly, packet data networks in general, and the Internet in particular, possess inherent characteristics that potentially allow for improvement in performance, cost, functionality, and flexibility by transcending the sequential data communication property. That is, paralleling data communication results in radical improvements in the capabilities of many packet data networks.

Forms of parallel data communications have been attempted, but generally suffer from a number of deficiencies. For example, forms of parallel data communications systems, such as simple aggregation, link bundling, and channel bonding, implicitly require homogeneous network resources to perform well. Accordingly these technologies, in general, assume that the aggregated resources will provide consistent and predictable performance characteristics. Thus, simple leveraging schemes that split data over multiple resources with appropriate buffering at the receiving end fail to achieve effective aggregation in dynamic network environments. When homogeneity and/or consistency of the network do not exist, the simplistic strategy employed may not produce the desired performance.

U.S. Pat. No. 6,625,161 ("the 161 patent") describes a communication system using one variation of simple aggregation. Specifically, the '161 patent is directed to a system for combining a plurality of parallel communication channels to emulate a single high-bandwidth communication channel. A continuous stream of packets are grouped as traffic aggregates and assigned to queues associated with the plurality of parallel communication channels. The assignment and reassignment of traffic aggregates to the queues is performed dynamically based on measuring queue load ratios associated with the lengths of the queues for each of the parallel communication channels. Grouping of existing and future packets as traffic aggregates is based on common attributes shared by the packets such as common source and destination IP addresses.

However, like other simple aggregation techniques, the system of the '161 patent suffers from a number of deficiencies. For example, because the packets are reassembled at the receiver end, the performance of the aggregation is dependent on the path with the lowest performance.

An example of the lowest path performance deficiency may be illustrated with a simple aggregation system having two paths, the first path having a greater bandwidth than the second path. Eight of ten packets are delivered along the first path and arrive at the destination in 1 ms. Because the entire communication has not been received, these eight packets are buffered at the receiver until the remaining two packets arrive. The remaining two packets are delivered along the second path, but it takes 500 ms for the remaining two packets to arrive at the destination. Accordingly, the entire communication is not available to the destination for at least 500 ms. Therefore, in some cases, particularly situations in which the paths do not have similar network characteristics, simple aggregation systems do not improve the overall network performance.

Furthermore, simple aggregation systems are not typically designed to adequately handle changing network conditions along a communications path, and may not install and operate seamlessly within existing networks.

Accordingly, what is needed is a parallel communications system that: is capable of working with both homogeneous and heterogeneous network elements (with and without diversity in performance characteristics of the individual network resources); is capable of adapting to changing network environments; is capable of being deployed as an overlay to existing networks; and does not require changes to network applications to realize the benefits.

SUMMARY

Systems and methods for the communication of data over a plurality of parallel communication paths are provided.

An embodiment of a method for communicating data over parallel data paths includes characterizing each of a plurality of parallel data paths by repeatedly determining path properties, the plurality of parallel data paths defining a single virtual connection between a sending node and receiving node; and scheduling the transmission of data across the plurality of parallel data paths to meet an objective function, the scheduling based on the path properties.

One embodiment of a system for communicating data over parallel data paths includes a processor configured to fetch and execute instructions from an instruction execution system. The executable instructions characterize each of a plurality of parallel data paths by repeatedly determining path properties, and the plurality of parallel data paths may define a single virtual connection between a sending node and receiving node. The instructions may further include instructions for scheduling the transmission of data across the plurality of parallel data paths to meet an objective function, the scheduling based on the path properties.

The instructions for scheduling the transmission of data may further include instructions for scheduling a first transmission of data along a first path of the plurality of parallel data communication paths to be received at the destination; and instructions for scheduling a second transmission of data along a second path of the plurality of parallel data communication paths, the second transmission of data scheduled to be received at the receiving node in a predetermined sequence in relation to the first packet.

Another exemplary embodiment of a system for communicating data over parallel data paths includes means for characterizing each of a plurality of parallel data paths by repeatedly determining path properties, the plurality of parallel data paths defining a single virtual connection between a sending node and receiving node; and means for scheduling the transmission of data across the plurality of parallel data paths to meet an objective function, the scheduling based on the path properties.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Systems and methods for the communication of data over a plurality of parallel communication paths are disclosed. The parallel communications systems and methods may discover, characterize, and leverage a multiplicity of resources in various network elements of the communication system to provide network applications with a desired communication objective and level of performance. The systems and methods may dynamically adapt to changes in the network resources to continuously provide the desired communication performance.

Although the systems and methods may be implemented on or between any of the seven International Standard Organization's Open System Interconnect (ISO/OSI) network layers, one embodiment of a parallel communication system is implemented as a layer-4 (transport) protocol technology that operates on IP traffic to leverage the multiplicity of network resources.

Figure 1:
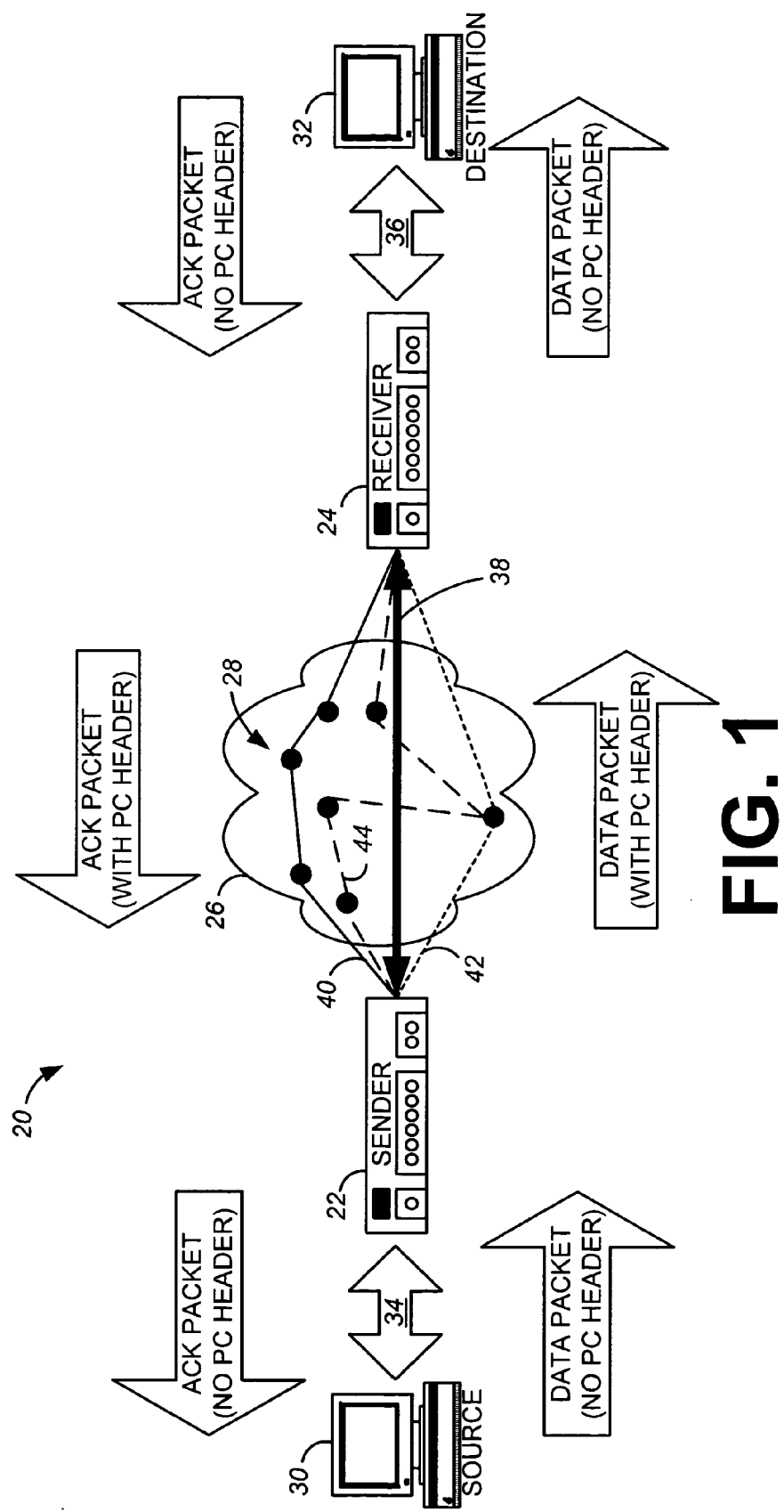
FIG. 1 depicts an embodiment of an exemplary parallel communication system capable of communicating of data over a plurality of parallel communication paths.

FIG. 1 depicts an exemplary parallel communication system 20. The data communicated through the parallel communication system 20 may be referred to as being encapsulated within a data packet. However, the data is not required to be in any particular form, and instead, may be in the form of a segment, a frame, a byte, or a bit, for example.

One embodiment of a parallel communication system 20 may include a sender parallel communication transceiver 22 and a receiver parallel communication transceiver 24. Each of parallel communication transceivers 22 and 24 may reside in a router-independent, standalone unit which may be deployed on either side of a section of a network 26 for which the multiplicity is to be leveraged.

Network 26 may, for example, be a local-area network (LAN), wide-area network (WAN), or the Internet. Legacy network nodes 28, depicted as solid black circles in FIG. 1 may be existing networked computing devices such as routers, for example. In some embodiments, legacy network nodes 28 may be modified to contribute specific intelligence to parallel communication transceivers 22 and 24. However, in general, the legacy network nodes 28 do not require modification for use in the system. Thus, no changes to existing infrastructure within network 26 are required.

The embodiment of FIG. 1 depicts source computing device 30 and a destination computing device 32 which communicate with parallel communication transceivers 22 and 24 through connections 34 and 36, respectively. Source computing device 30 and destination computing device 32 may be referred to generically as communications endpoints and represent any number of computing devices that may use parallel communication transceivers 22 and 24 to leverage the multiplicity of network 26. Connections 34 and 36 may represent any number of wired or wireless connections, and may represent one or more networks which may also include a number of other networked computing devices.

In the present example, sender parallel communication transceiver 22 is responsible for sending data packets originating from source computing device 30 across network 26 to receiver parallel communication transceiver 24. Receiver parallel communication transceiver 24 is responsible for receiving packets sent by sender parallel communication transceiver 22 and forwarding them to destination computing device 32. Although transceiver 22 and 24 are referred to as a sender and receiver, respectively, it should be understood that each transceiver may be configured equivalently to operate both as senders and receivers of parallel communication data. However, for simplicity, the specific example of FIG. 1 depicts the transfer of data packets in a single direction across network 26 (left to right) and depicts the transfer of acknowledgement (ACK) packets in an opposite direction (right to left). Thus, in some embodiments, data packets and acknowledgement packets may be sent in opposite directions across network 26, with transceiver 24 acting as the sender and transceiver 22 acting as the receiver.

Additionally, for the sake of simplicity, only two sets of parallel communication transceivers, connections, and endpoints are depicted. However, any number of communication transceivers may be interfaced to network 26 for the purpose of leveraging network 26 for an associated communications endpoint.

Source computing device 30 and a destination computing device 32 may include a number of applications that use network 26 to transfer packet data between the devices. For example, source computing device 30 may include a server application for transmitting data to a client application on destination computing device 32. Similar to the legacy network nodes 28, the application(s) associated with source computing device 32 and destination computing device 34 may be unaware of parallel communication transceivers 22 and 24 and require no changes in design or operation.

A connection may be described as an end-to-end communications link between two network entities, without regard to how the packet arrives at the destination. For example, connection 38 represents the end-to-end communications link between parallel communication transceivers 22 and 24. A connection may be referred to herein as a "virtual" connection because, in reality, the connection may represent a number of paths forming the end-to-end link.

Thus, a path may describe one of a number of routes that a data packet may travel between two entities (i.e. over the virtual connection). For example, path 40 (solid line) represents a first path for which a data packet travels along connection 38. Similarly, path 42 (dotted line) and path 44 (dashed line) represent a second and third path for which a data packet may travel along connection 38. Paths 40, 42, and 44 may be referred to as parallel paths in that they represent three different routes for packet data to propagate through network 26 at the same time. Although only three paths are depicted in FIG. 1, there may be a number of paths formed by any number of nodes that a packet may travel over the connection. Furthermore, it should be understood that a path may comprise a single point-to-point link and may also include multiple virtual circuits over a single physical connection. In some embodiments, the virtual circuits may be addressable through, for example, port numbers or multiple protocol label switching (MPLS) labels.

Parallel communication transceivers 22 and 24 are configured to leverage the parallel paths to provide a level of service for each of one or more objective functions to the endpoints. Exemplary objective functions may be a measure of bandwidth, delay, jitter, loss rate, security, resilience, and cost. A level of service may refer to, but is not limited to, the desired amount of bandwidth, or the allowable delay, jitter, loss rate, security, resilience, or cost.

For example, a desired amount of bandwidth may be accommodated by seeking and aggregating the paths having the desired bandwidth once combined in parallel. In contrast, some applications may require less bandwidth, but require improved delay and jitter performance. For example, voice over Internet protocol (VoIP) predominantly requires a connection having a bandwidth of less than 100 Kbps, but requires more stringent control of delay, jitter, and data loss. Furthermore, if an expensive 3G data path and a cheap 802.11 data path are serving the VoIP call, cost minimization may be prioritized. Accordingly, the objective functions may be accommodated by the parallel communication transceivers 22 and 24 selecting a number of parallel paths having the most favorable characteristics for meeting the desired level of service, and then appropriately scheduling the transmission of data packets across the selected paths.

Figure 2:
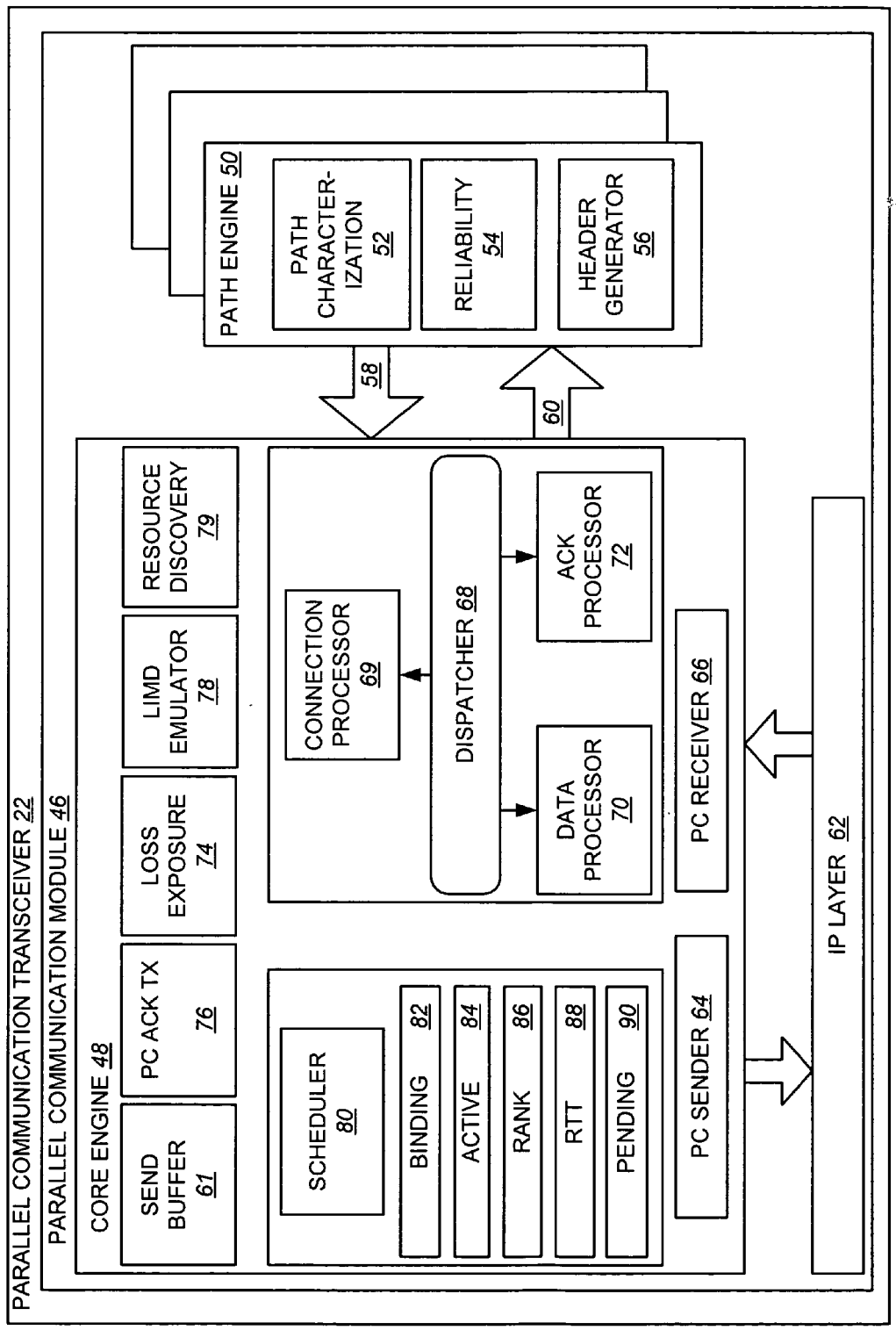
FIG. 2 depicts a block diagram of an embodiment of the parallel networking transceiver used to provide the parallel communication within the network of FIG. 1.

FIG. 2 depicts a block diagram of the architecture of an embodiment of a parallel communication module 46 that may be executed within sender parallel communication transceiver 22 for implementing the parallel communication systems and methods. Although not depicted, receiver parallel communication transceiver 24 may use the same, or similar, architecture.

Generally speaking, parallel communication transceiver 22 may comprise any one of a wide variety of wired and/or wireless computing devices, such as a laptop computer, PDA, handheld or pen based computer, desktop computer, dedicated server computer, multiprocessor computing device, embedded appliance, router, networking device, and so forth. Irrespective of its specific arrangement, a parallel communication transceiver can, for instance, comprise a bus which may connect a display, memory, mass storage device, network interface, processing device, and input/output interfaces.

The associated processing device can include any custom made or commercially available processor, a central processing unit (CPU) or an auxiliary processor among several processors associated with the parallel communication transceiver, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

Input/output interfaces provide any number of interfaces for the input and output of data. For example, these components may interface with a user input device, which may be a keyboard or a mouse, buttons, a touch sensitive screen, a stylist, etc. A display can comprise a computer monitor or a plasma screen for a PC or a liquid crystal display (LCD) on a hand held device, for example.

The memory can include any one of a combination of volatile memory elements (e.g., random-access memory (RAM, such as DRAM, and SRAM, etc.)) and nonvolatile memory elements (e.g., ROM, hard drive, tape, CDROM, etc.). The memory may also comprises a native operating system, one or more native applications, emulation systems, or emulated applications for any of a variety of operating systems and/or emulated hardware platforms, emulated operating systems, etc.

Each of the described modules, and any sub-modules, may comprise an ordered listing of executable instructions for implementing logical functions. When the executable modules are implemented in software, it should be noted that the system can be stored on any computer-readable medium for use by, or in connection with, any computer-related system or method. In the context of this document, a computer-readable medium is an electronic, magnetic, optical, or other physical device or apparatus that can contain or store a computer program for use by or in connection with a computer-related system or method. The executable modules can be embodied in any computer-readable medium for use by, or in connection with, an instruction execution system, apparatus, or device, such as a computer-based system, processor-containing system, or other system that can fetch the instructions from the instruction execution system, apparatus, or device and execute the instructions.

In the context of this document, a "computer-readable medium" can be essentially anything that can store, communicate, propagate, or transport the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and optical mediums such as a digital versatile disc (DVD) or compact disc read-only memory (CDROM). Note that the computer-readable medium could even be paper or another suitable medium upon which the program is printed, as the program can be electronically captured, via optical scanning of the paper or other medium, then compiled, interpreted or otherwise processed in a suitable manner if necessary, and then stored in a computer memory.

Parallel communication module 46 may include two primary submodules: core engine 48 and path engine 50. Core engine 48 is primarily responsible for per-connection functionality, and path engine 50 is primarily responsible for per-path functionality and state. The dichotomy of these modules serve to create one potential advantage over existing technologies that do not distinguish between path and connection functionality.

While functionality refers to the "behavior" or "algorithm" employed by the system, such behaviors and algorithms may operate on, and maintain data-structures, which may be referred to herein as "states." Accordingly, multiple connection states may be created for a single connection. Likewise, for functionality maintained at the path level, such as congestion control, multiple states (e.g. available rate) may be maintained for each path.

A traditional layer-4 technology, such as TCP, has an integrated design in terms of functionalities like connection management, congestion control, reliability, and flow control, etc. However, such a design is inherently flawed for effective parallel communication because integrated operation does not distinguish between per-path characteristics, and per-connection characteristics.

However, unlike TCP, parallel communication transceivers 22 and 24 may decouple various functionalities of the network into per-path and per-connection functionality. For example, the described parallel communication systems may treat flow-control, connection management, and connection reliability as connection level functionalities, and may associate path management, congestion control, throughput estimation, loss estimation, delay estimation, and estimation of other network parameters as per-path functionality.

One example of the potential benefits of decoupling network functionality into per-path and per-connection functionalities (and associated states) for the parallel usage of resources may be illustrated in the context of a network having two parallel paths P1 and P2. Paths P1 and P2, may, for example have an available throughput of 50 units and 100 units, respectively. In this example, a connection uses both paths to their fullest availability. Hence, the total rate of the connection is capable of operating at 150 units.

Using the TCP congestion control mechanism known as linear increase/multiplicative decrease (LIMD), if path P1 experiences a loss, TCP (which does not maintain decoupled states or perform decoupled functionality) is designed to cut the rate of the entire connection by one-half. Accordingly, the connection's total rate is lowered to 75 units.

However, even assuming that the two paths are used in a best effort network (in which case cutting down the rate by half is the "correct" behavior), the ideal reaction would be a halving of the rate on only the path with the loss, rather than the entire connection.

Accordingly, by decoupling the functionality (and associated state) of the individual paths from the connection, each path may be maintained separately. Accordingly, in this example, the rate of P1 may be halved to 25 units, leaving the rate along P2 (100 units) unaffected, for a total rate of 125 units. Thus, a significant improvement in performance may be achieved in comparison to traditional approaches that do not decouple the connection from each path in the connection. Said another way, this improvement is achieved by perceiving each path to be independent entities, and treating them as such.

Now that the concepts of connections and paths have been generally described, the concept of a parallel communication session is described. Specifically, each parallel communication session may generally be associated with a parallel communication module 46, and thus describes a specific set of a core engine 48 instance along with its associated path engine 50 instances(s) created based on a configured trigger. The trigger may be configured, for example, through a user interface, for example.

A trigger may be configured based on specific applications, application types, source-destination addresses, source-destination addresses and ports, for example. Upon a parallel communication transceiver receiving a packet matching a configured trigger, and a communication session already has not been set for that matching trigger, a new session may be instantiated. Because each session instance may include its own core engine 48 and associated data structures, each session can have its own objective functions that are independent of any other session instance.

Triggers may, for example, be based on a specific application, such as VoIP traffic or ftp traffic. Thus, core engine 48 may be configured to schedule packets to be received based, in part, on meeting one or more objective functions that match the session instance. For VoIP, the objective function may be reducing jitter, and for ftp traffic, may be maximizing throughput. Accordingly, a sending communications transceiver may receive packets to be scheduled for transmission by a number of core engine 48 instances. In some cases, even though the destination endpoint may be the same, a different set of paths and scheduling may be used based on the objective function of each session.

Triggers may, for example, be based on a destination address. In one embodiment, a trigger configuration may be set to create a new session for each new destination IP address detected. If a new packet with a destination IP address "X" is received by a parallel communication transceiver, a new parallel communication session will be created corresponding to "X." For any more packets received with destination address "X," these packets may be served by that session, which may include its own core engine 48 and path engine 50 instance(s).

Now that the concept of a parallel communication session has been described, more detail as to its components, path engine 50 and core engine 48, are described in more detail. In general, path engine 50 is responsible for tracking per-path functionalities, including path characterization and ensuring the reliable delivery of packets within a path. In contrast to path engine 50, core engine 48 may be responsible for per-connection operations such as connection management, connection reliability, flow control, and scheduling. Core engine 48 may also maintain information about the parallel paths for a particular connection. Core engine 48 may be configured as the primary interface for network traffic. For example, in the embodiment of FIG. 2, core engine 48 interfaces to the underlying IP layer 62 through parallel communication sender module 64 and parallel communication receiver module 64, for sending and receiving packets respectively. Core engine 48 may include a number of modules including connection processor 69, dispatcher module 68, data processor module 70, a send buffer 61, loss exposure module 74, parallel communication ACK transmitter module 76, LIMD emulator module 78, resource discovery module 79, and scheduler module 80. The functionality of these, and other modules, will be explained in more detail with respect to core engine 48, and within the context of the interaction of path engine 50.

With respect to path engine 48, FIG. 2 depicts a number of path engine 50 instances, which may be created for every path to be used in the network. Further, a path engine instance for a given path may, for example, be created for every new connection (or session, application, etc, depending upon the granularity of traffic separation configured into the system) that will be using the path. An instance of a path engine 50 may be created, for example, upon the first packet of a connection arriving at the parallel communication transceiver.

Each instance of path engine 50 may include a path characterization module 52, for characterizing the associated path to determine path properties. More specifically, although path characterization module 52 may handle a number of other functions, in general, path characterization module 52 may repeatedly determine path properties as they change over time. Examples of the path properties may include the instantaneous, mean, and distribution of throughput, bandwidth, delay, jitter, loss rate, cost, and security, for data transmitted over a particular path. In practice, many network paths have dynamic conditions, having periods of differing throughput, bandwidth, delay, data loss, jitter, data flow, cost, and/or security, for example. In fact, paths may completely cease to function. Thus, the path characteristics are repeatedly determined (e.g. periodically, dynamically, continuously, and/or randomly, etc.) such that dynamic path conditions are captured.

Path characterization may be active or passive. Active characterization may include adding a header to packets that include information which may be used to deductively determine the properties (e.g. time stamps). In contrast, passive characterization may use information already embedded in the data (e.g. in a TCP header) to deductively determine the properties, or may deduce path properties from the receipt or lack of receipt of packets. For example, by observing TCP acknowledgements, the system may infer the occurrence, or lack thereof, of losses.

Passive characterization may include monitoring the characteristics of data packets delivered along the various paths. Some embodiments may include the ability to re-use existing layer-4 technology protocol operations to perform the path characterization. Thus, through an understanding of transport protocol operations (e.g. TCP), the system may be configured to actively re-use the transport protocol's mechanisms to perform path characterization. Accordingly, path characterization may leverage this awareness of higher layer protocols, such as the TCP transport layer.

It is not necessary for the module to determine all of the properties of the path. Rather, only those properties required for a specific objective (e.g. an amount of bandwidth, jitter, or cost) need be collected. For example, in the embodiment of FIG. 2, one objective function is maximizing bandwidth. Accordingly, in the present embodiment, path characterization module 52 may be generally used for characterizing the bandwidth of each path. Specifically, path characterization module 52 may determine and continuously track how much data is sent across the corresponding path for the purpose of determining how much data is to be sent through a specific path. Thus, congestion control (a path related functionality) is decoupled from connection reliability (a connection related functionality).

The congestion control of a path generally refers to determining the amount of data to be sent through a path. In some embodiments, it is potentially advantageous to handle congestion control as a per-path functionality for at least the reason that each path has different bandwidth characteristics, and each path may have different traffic flowing through it. Accordingly, by decoupling the congestion control, paths with heterogeneous characteristics (e.g. different bandwidth, jitter, cost, security, etc) may be leveraged more effectively. Accordingly, path characterization module 52 may be configured to communicate with core engine 48 for the purpose of letting core engine 48 know when a particular path is available for the transmission of data.

In one embodiment, each path engine 50 instance may use the congestion-window based bandwidth estimation mechanism used by TCP. Specifically, a bandwidth estimator in the path engine 50 may use a congestion window as an approximation of the bandwidth-delay product (capacity) of the path engine's corresponding path. The congestion window may be maintained based on the Linear Increase/Multiplicative Decrease (LIMD) policy as used by the TCP congestion control mechanism. LIMD achieves fair sharing of the path bandwidth among legacy Internet flows.

Path engine 50 may also use the slow-start phase of the TCP congestion control mechanism to probe for available bandwidth. In the slow-start phase, the path characterization module 52 may increase the congestion window by two for each received ACK packet. A threshold value of the congestion window may be used to determine the point of transition from slow start to congestion avoidance. The threshold value is half of the congestion window value when loss occurs. In the congestion avoidance phase, path characterization module 52 may, for example, increment the congestion window size by one for every received ACK packet.

When path characterization module 52 detects a loss through the reception of a third successive duplicate ACK packet, path characterization module 52 may be configured to cut the congestion window by half and continue with the congestion avoidance phase. If path characterization module 52 detects loss through the expiry of the timer waiting for an ACK packet, path characterization module 52 may be configured to reduce the congestion window size to one and proceed with the slow-start phase.

The path characterization module may also perform estimation of path properties, which may include parameters such as, but not limited to, bandwidth, loss, delay, jitter, etc., explicitly using mechanisms such as TCP-friendly rate control (TCP), guaranteed TCP (GTCP), binomial congestion control (BCC), etc. In some embodiments, the path characterization module may perform the estimation of the path properties using a custom estimation approach that may, for example, maintain average and deviation values for each of the parameters. The estimation approach may further include updating the parameters through appropriate weighted averaging techniques, using information learned from each ACK received. For example, an ACK arriving at time $T_r$ for a data packet sent at time $T_t$, the average delay value may be updated as follows:

$$\text{Delay}_{avg} = k * \text{Delay}_{avg} + (1-k) * (T_r - T_t) \qquad (\text{Eq. 1})$$

Where k may be a constant value less than one and greater than zero. For example, k may be set to a value between 0.75 and 1.0, which may avoid rapid reactions to network transients.

In general, header generator module 56 generates a path header to be sent to core engine 48. The path header may include path information such as, but not limited to, the latest round trip time (RTT) estimate, a path-level sequence number, port information, checksum, a path-level ACK sequence number, flow control information, and flags to indicate which of the above fields are valid. Core engine 48 generates a connection header which may be combined with this path header to form a parallel communication header. The connection header may include connection information such as, but not limited to, a connection identifier, a connection sequence number of the data packet, connection-level ACK sequence number, a number of transmission paths being used, and number of reception paths being used. The parallel communication header may then be transmitted with the packet as will be described in more detail with respect to core engine 48.

Header generator module 56 may be configured to create the path header for a data packet upon a request from path characterization module 52. The request from path characterization module 52 may provide the header generator module 56 with information to be included in the header to be created. For example, path characterization module 52 may provide the path-level sequence number and the latest round trip time (RTT) estimate, etc.

Path characterization module 52 may be configured to send the path header created by header generator module 56 to core engine 48 through interface 58 through a send_data( ) call. Specifically, a send_data( ) call may indicate to scheduler module 80 (of core engine 48) that a data packet may be sent across the path associated with the path engine 50 instance making the call. The information in the path header may be used by scheduler module 80 (in core engine 48) to schedule the delivery of a packet across the identified path. An exemplary algorithm for scheduling the delivery of the data packets across the path will be described in more detail with respect to scheduler module 80 below.

Path characterization module 52 may implicitly estimate the available bandwidth by indicating the ability to send new packets under a variety of conditions. For example, in one embodiment, path characterization module 52 may send the send_data( ) call to scheduler module 80 under the following conditions:

(i) An indication of a successful receipt of a previously transmitted packet, (e.g. an receipt of an ACK from the previously transmitted packet).
(ii) The phase of path characterization module 52 (e.g. bandwidth probing or normal operations); and/or
(iii) If the number of additional packets decided to be sent is a fraction, any value less than one is accumulated until a subsequent increase enables the transmission of a whole packet.

Core engine 48 may include a send buffer 61, which may be used to hold a number of standard packets to be transmitted over the parallel communication paths 40, 42, and 44. Standard packets may be packets that do not include a parallel communication header, such as typical TCP packets or UDP packets. For example, standard packets can be those sent from a source computing device 30 to sender parallel communication transceiver 22, or from receiver communication transceiver 24 to destination computing device 32, for example. Thus, upon receipt of a path header from path characterization module 52, core engine 48 may determine whether any data packets are ready to be sent by checking for a quantity of data packets to be sent in send buffer 61.

If data packets are present in send buffer 61, the core engine 48 picks the next unbound packet (packet in the buffer that does not have a binding in a binding data structure), binds the packet to the header sent by path characterization module 52, and sends it to out through the parallel communication sender 64.

However, if data packets are not present in send buffer 61, core engine 48 may respond to path characterization module 52 (e.g. over interface 60) with an indication of the absence of data packets to be sent. This indication may be referred to as a FREEZE command. On receipt of the FREEZE command from core engine 50, path characterization module 52 may be configured to deactivate the bandwidth estimation and may also inform the path header generator module 56 that core engine 48 does not have packets in the send buffer 61. Path engine 50 may be configured to re-activate the bandwidth estimation and header generation functions on the reception of an indication from core engine 48 that data packets are queued in send buffer 61. This indication may be referred to as a RESUME command sent by core engine 48.

Path characterization module 52 may also be configured to inform core engine 48 of a change in the bandwidth estimation through interface 58. For example, path characterization module 52 may be configured to update the bandwidth estimate when path characterization module 52 receives an ACK packet from a previously transmitted packet. This ACK packet may, for example, be passed from dispatcher module 68, located in core engine 48, which will be discussed in more detail below.

In general, reliability module 54 may ensure the reliable delivery of packets along the associated path associated with the path engine 50 instance. It should be understood that, for the effective decoupling of path reliability from the reliability of each connection, core engine 50 may be configured to handle the connection reliability. Accordingly, connection reliability is discussed in more detail with respect to core engine 48 below.

With respect to path reliability, reliability module 54 may be configured to receive ACKs from dispatcher 68, and utilize cumulative and selective ACKs to determine whether the packets have been properly received. For example, when cumulative acknowledgements are used, receipt of a predetermined number of duplicate acknowledgements results in an inference of a packet loss. For example, if three duplicate ACKs consecutively provide the same sequence number, it is inferred that the packet corresponding to that sequence number is lost (and thus should be retransmitted).

When selective ACKs are used, more specific information is given by the receiver to the sender to identify which packets are lost. For example, the receiver may indicate the receipt of packets 5-11, 13-29, and 31-48 to the sender. Thus, the sender may infer that packets 12 and 30 have been lost (and thus should be retransmitted).

Furthermore, if the connections served are TCP flows, reliability module 54 may be configured to re-use the TCP headers. Specifically, the ACK sequence number in the TCP header may be used by the system to exchange information about lost packets as described above.

Now that the general functionality of path engine 50 has been described, core engine 48 is described more detail. As mentioned previously, core engine 48 may be responsible for per-connection operations such as, but not limited to, connection management, connection reliability, flow control, and scheduling. It should be understood that some embodiments of core engine 48 may not include all of these features, and other embodiments may include a variety of other features.

In some embodiments, flow control may not be necessary because the amount of buffer maintained by the destination may be the deciding factor in performing flow control. Thus, the destination transceiver may be configured to inform the source transceiver of the amount of receive buffer available. Thus, the source may use this information to adapt its sending rate to avoid overflow of the destination buffer. Accordingly, in one embodiment, the buffer size used in the sending parallel communication transceivers are the same as the buffer size used at the destination parallel communication transceivers to avoid drops communication due to the overflow of the receiving buffer.

In the embodiment of FIG. 2, core engine 48 may include dispatcher module 68 for classifying incoming packets received from the IP layer 62 through an interface with parallel communications receiver module 66. Specifically, dispatcher module 68 may examine the header of incoming packets to determine the content type (e.g. data or an ACK). Accordingly, data packets are forwarded to data processor module 70, and ACK packets are forwarded to ACK processor module 72.

However, before forwarding the packets to either of data processor module 70 or ACK processor module 72, connection processor 69 may examine the packets to identify whether or not the packet is associated with a known connection. If the connection is not known, connection processor 69 may create the appropriate data structures for the newly discovered connection.

In general, data processor module 70 may process data packets received from dispatcher module 68. Data processor module 70 may be configured to perform a number of operations based on the type of packet received. Specifically, data processor module 70 may be configured to detect whether a received packet includes a parallel communication header.

For example, looking back to FIG. 1, sender parallel communication transceiver 22 receives standard data packets which do not have a parallel communication header from source computing device 30. Accordingly, data processor module 70 buffers the received data packet in send buffer 61 for eventual transmission across network 26.

In contrast, parallel communication transceiver 24 receives parallel communication data packets (e.g. those that are encapsulated in a parallel communication header) from parallel communication transceiver 22 over any combination of parallel paths 40, 42, and 44. Upon parallel communication transceiver 24 receiving a parallel communication data packet, data processor module 70 may remove the connection header from the data packet and extract the connection information from the header. Core engine 48 may update the corresponding connection variables and data structures from the connection header. For example, core engine 48 may update the RTT values, purge the send buffer of ACKed packets, and update a rank data structure, which is described in more detail below.

Data processor module 70 may also remove the path header from the data packet and forward the path header to the path engine 50 associated with the corresponding path through interface 60. The corresponding path may, for example, be determined from the path sequence number and/or the source and destination addresses in the path header. Path engine 50 may then send back an ACK to the sending parallel communication transceiver. The ACK may indicate the successful receipt of the data packet and may include information about the data packet transmission, such as RTT values copied from the data packet. Data processor module 70 may be responsible for the aggregation of received data packets, for ultimate delivery to the destination endpoint device. Once the parallel communication header has been removed, data processor module 70 may send the resulting standard data packet, which may be a standard TCP data packet, to the IP layer through parallel communication sender interface 64. In one embodiment, data processor module 70 may be configured to perform conditional reassembly. That is, data processor module 70 may be configured to reorder the received data only upon the received data meeting a condition requiring resynchronization. The conditional reassembly process may, for example, reorder the received data into the predetermined sequence which they were to be received, as scheduled by scheduling module 80.

For example, data processor module 70 may send the packet to the IP layer only under one of two conditions: (i) the higher layer protocol is one that requires the in-sequence delivery (e.g. TCP), and the data packet is an in-sequence packet, or (ii) the higher layer protocol is not one that requires in-sequence delivery. The standard data packet may then be transmitted to the ultimate destination of the end-to-end connection, here destination computing device 32. If both of the conditions are not satisfied, the data packet is held in the data buffer until a new data packet arrives. For every data packet received, the core engine may drain as many buffered packets as possible based on the above conditions.

Upon the receipt of an ACK packet, dispatcher module 68 forwards the packet to ACK processor module 72. In general, ACK processor module 72 provides reliability and congestion control by processing connection and path headers and providing the associated per-connection and per-path feedback.

More specifically, ACK processor module 72 may also perform a number of operations based on the type of packet received. For example, if ACK processor module 72 detects that the received ACK packet is a parallel communication ACK packet (e.g. by detecting a parallel communication header) then ACK processor module 72 may remove the connection header from the data packet and extract the connection information from the header. Furthermore, because the acknowledgement has been received, ACK processor module 72 may be configured to remove the corresponding data packet from send buffer 61.

ACK processor module 72 may also remove the path header from the parallel communication ACK packet and forward the path header to path engine 50 through interface 60. ACK processor module 72 may also forward the standard ACK packet, which may be a TCP ACK packet, to loss exposure module 74.

In general, loss exposure module 74 assists source computing device 30 adapt to the aggregate bandwidth of the multiple paths. More specifically, loss exposure module 74 selectively exposes packet data losses to the source of data (e.g. source computing device 30) with the goal of causing the source to adapt to the aggregate rate of the paths, avoiding the possibility of under utilization or over-shooting by the source of data.

LIMD emulator module 78 may be used in conjunction with loss exposure module 74 to emulate the behavior of a TCP sender adhering to the linear increase/multiplicative decrease (LIMD) transmission policy. LIMD emulator module 78 may emulate the same congestion control mechanism that a TCP sender would perform when receiving the same number of ACK packets. In the embodiment of FIG. 2, LIMD emulator module 78 may be notified about received ACK transmissions by loss exposure module 74, for example, through the emul_ack( ) call. Furthermore, LIMD emulator module 78 may be configured to reset the number of packets sent to zero and to return the number of packets sent when it receives corresponding inquiries from loss exposure module 74. For example, an inquiry to LIMD emulator module 78 to determine the number of packets sent may be used to determine if a loss should be exposed to the sending TCP. Accordingly, when a loss is exposed, the reset inquiry is used to reset the operations of LIMD emulator module 78.

In one embodiment, loss exposure module 74 may forward all ACK packets to the source except those ACK packets that indicate loss. On the reception of a loss-indicating ACK packet, loss exposure module 74 may compare pkts_sent and Tn. The pkts_sent variable and Tn may correspond to the number of packets sent by the parallel communication sender 64 and the LIMD emulator 78, respectively. The value of Tn may, for example, be obtained by loss exposure module 74 calling a emul_num( ) function of LIMD emulator 78.

If Tn-pkts_sent>μ, where μ is a constant threshold that is configurable, then loss exposure module 74 may forward the ACK packet to the IP layer, reset the pkts_sent variable to 0, and call the emul_reset( ) function of LIMD emulator module 78 to reset the number of packets sent from the LIMD emulator to 0. Otherwise, if Tn-pkts_sent<μ, loss exposure module 74 may be configured to drop the ACK packet. Loss exposure module 74 may also notify LIMD emulator module 78 upon forwarding an each ACK packet to the IP layer. This notification may, for example, occur through an emul_ack( ) call.

If the ACK packet is received from the destination, indicated by the absence of the parallel communication header, the ACK processor module forwards the packet to parallel communication ACK transmitter module 76. On reception of a standard ACK packet from ACK processor module 72, parallel communication ACK transmitter module 76 requests an ack_mapping data structure, determines the corresponding path engine, and requests the path header from the corresponding path engine 50. The ack_mapping data structure, for example, may maintain the appropriate sequence numbers for packets that arrived along a specific path. By maintaining the sequence numbers and associated paths, the ACKs corresponding to the packets may be sent along the same paths.

The corresponding path engine 50 returns the corresponding path header for the identified ACK packet. Parallel communication ACK transmitter module 76 may then encapsulate the received ACK packet with a parallel communication header, including the path header and a connection header. ACK transmitter module 76 may then send the constructed parallel communication ACK packet to IP layer 62, through the parallel communication sender 64, for delivery of the ACK packet to the sender parallel communication transceiver.

Resource discovery module 79 may passively or actively discover resources available to transmit data across network 26. In the embodiment of FIG. 1, for example, resources may be nodes 28 and other parallel communication transceivers 22 and 24, which connect to form paths 40, 42, and 44. When passively monitoring traffic, resource discovery module 79 receives data packets from IP layer 62 and extracts the P header from each packet to determine the source and destination node of each network packet. Accordingly, by determining the source and destination node in a packet, a path may be inferred to exist between these nodes.

The discovered source and/or destination node may be a potential parallel communication transceiver. For example, resource discovery module may infer that the source and/or destination is a parallel communication transceiver if the received packet includes a parallel communication header.

Upon discovering a potential parallel communication transceiver, resource discovery module 79 may then confirm the discovered resources by transmitting a discovery packet (e.g. a "ping") to the network resources, which may include, for example, a parallel communication header. Other parallel communication transceivers receiving this ping may be configured to respond by acknowledging the ping with an ACK packet encapsulated with a parallel communication header. In some embodiments, the responding parallel communication transceivers may be configured to supply information about known paths, path characteristics, and connections served by the responding parallel communication transceiver between other known parallel communication transceivers.

Accordingly, resource discovery module 79 may also "discover" resources by being provided the identity of resources externally, such as from other network resources (e.g. parallel communication transceivers, routers, etc.) or through a configuration interface (which may be displayed through a graphical user interface). Although resource discovery module 79 may be provided with the identification of resources, resource discovery module 79 may, as above, confirm the availability discovered resources by transmitting a discovery packet (e.g. a "ping") to the network resources, which may include, for example, a parallel communication header.

Resource discovery module 79 may also perform a network wide broadcast, as opposed to a pointed ping, of the discovery packet to learn of other parallel communication transceivers in the network. In this case, all parallel communication transceivers receiving the broadcasted discovery packet may be configured to respond with an appropriate ACK message to indicate its presence.

Additionally, resource discovery module may maintain the status of discovered resources by repeatedly transmitting discovery packets to known nodes, such as parallel communication transceivers, for the purpose of determining an availability of the nodes to receive and potentially retransmit data over a path.

Once the resources are discovered, the individual links between intermediate resources are used to abstract on or more paths between two parallel communication transceivers. Looking to FIG. 1, the links between each node 28 are abstracted into each of paths 40, 42, and 44 forming the single virtual connection 38. Once a path is abstracted, core engine 48 stores the path as a potential resource for transmitting data over a connection. New instances of path engines may be created as new connections are discovered that can use the path.

The actual directing of the data along a path, which may include routing data through multiple parallel communication transceivers or legacy nodes, may be performed using widely adopted routing standards such as, but not limited to, IP-in-IP encapsulation, minimal IP encapsulation, or source routing. Since these techniques are widely adopted for the forcing of data through a particular path, the intermediate nodes within the path are not required to be other parallel communication transceivers, and can indeed simply be legacy routers that support the adopted routing standards. However, in some embodiments, it may be necessary to supply a parallel communication transceiver with the identification of legacy routers that support the supported routing standard (e.g. through external configuration).

In general, scheduler module 80 intelligently schedules packets to be transmitted in an effort to achieve an objective function (e.g. bandwidth maximization/throughput, minimization of delay, jitter reduction, cost reduction, security, increase in reliability (and loss rate), and/or resiliency). It should be understood that the objective function may be a combination of functions (e.g. increasing bandwidth and reduction of jitter). Scheduler module 80 may additionally be configured to meet a desired level of service (e.g. an amount of bandwidth, allowable jitter, cost level, etc.) of the objective function. The packet scheduling may be based on information such as, but not limited to, the identity of known paths, the dynamically updated characteristics of the paths, the stored state information about the path and/or connection, and by leveraging an awareness of higher layer (e.g. TCP) behavior.

For example, as mentioned, the objective function may be to maximize bandwidth or reduce jitter over a particular connection. Accordingly, packets arriving at sender parallel communication transceiver 22 from source computing device 30 are each assigned to the plurality of outgoing paths 40, 42, and 44 to arrive at the destination parallel communication transceiver 24 in substantially the same order and/or within the degree of synchronization required at the destination parallel communications transceiver.

Data may be scheduled to be received at the destination in a predetermined sequence in relation to the other scheduled data. For example, the predetermined sequence may correspond to: the order the data is received at the scheduler, the order the data is transmitted by a source computing device 30, data sequence information (e.g. data used to signify a particular order of a packet in a data communication, such as a numerical sequence embedded in the data packet headers), or the order data is to be transmitted from a parallel communication sender to a destination endpoint.

Thus, although packets may be actually be received at the destination transceiver 24 out-of-order, the packets are scheduled to be transmitted such that the out-of-order receipt is minimized, thus decreasing jitter and improving bandwidth.

Among other information, scheduler module 80 uses the dynamic characterization of the paths to continuously schedule the packets appropriately. For example, if path characterization module 52 determines that the available bandwidth of one path has decreased, scheduler module 80 may use this characterization information to adapt and schedule less packets to be transmitted across the affected path. Similarly, if a path is determined to be completely broken, packets may be scheduled to be transmitted over other paths.

Accordingly, to effectively synchronize data transmitted over each of the paths, scheduler module 80 may be configured to predict the arrival time of each packet sent over each path. For example, the arrival time may be based, at least in-part, on the RTT estimate provided by path characterization module 52. Additionally, in some embodiments, scheduler module 80 may be configured to consider the arrival probability of data to be transmitted over each path. The arrival probability, for example, may be derived from path properties such as the loss rate of a particular path. Thus, packets are redistributed based on the dynamic characteristics of the path.

Looking back at FIG. 2, in operation, scheduler module 80 may request a path header from an instance of path engine 50. On receipt of the path header, scheduler module 80 may select a data packet for transmission from send buffer 61. Scheduler module 80 encapsulates the selected data packet with a parallel communication header which includes the appropriate path header from path engine 50 and a connection header containing connection information. Scheduler module 80 may send the data packet, encapsulated with the parallel communication header, to IP layer 62 through the sender interface 64. Scheduler module 80 may also update the appropriate data structures.

Before discussion of the details of an exemplary algorithm used by scheduler 80, a number of data structures that may be used by scheduler module 80 are described in more detail. Binding data structure 82 is maintained on a per-path basis and, in general, may be used for storing the mapping of a connection sequence number and a corresponding path sequence number for a corresponding path. Specifically, for each data packet sent to the IP layer by scheduler 80, core engine 48 maintains the mapping between a local sequence number of the concerned path and a connection sequence number in binding data structure 82.

Similarly, core engine 48 maintains the same structure when a data packet is received. Specifically, data processor module may insert the mapping of the connection sequence number and the corresponding path sequence number in the binding data structure for the corresponding path on reception of a data packet from the PVN sender.

The active data structure 84 may store the identity of paths available for the transmission of data. For example, upon determining that data may be sent across an associated path, an instance of the path engine 50 for the specific path may indicate this readiness by sending a send_data( ) call to scheduler 80. However, if data packets are unavailable in the send buffer, core engine 48 may call the FREEZE function and the scheduler module may add the corresponding path to active data structure 84. When a data packet is placed in send buffer 61, scheduler 80 may issue a RESUME call to the path engine 50 instances corresponding to each of the paths identified in active data structure 84.

The rank data structure 86 may store information used for determining the rank of a data packet to be sent in send buffer. Specifically, for every transmitted data packet i sent through path j, the parallel communication sender 64 inserts an element into rank data structure 86 with a timestamp of $T_i + 2*RTT_j$ where $T_i$ is the time at which the data packet was transmitted and $RTT_j$ is the round trip time encountered through $path_j$. The RTT value may be taken from the RTT data structure, for example.

The RTT data structure 88 may store the round trip time estimates for a particular path. Specifically, scheduler module 80 may update (or insert) the corresponding entry in the RTT data structure upon receiving the RTT estimate of a particular path through the send_data( ) call from path engine 50.

The pending data structure 90 is used to store connection sequence numbers that are ready to be transmitted or retransmitted.

Now that the data structures used by scheduler module 80 have been described, the algorithms used by scheduler module 80 are described in more detail. It should be understood that, although path characterization module 52 (of path engine 50) may determine a quantity of data to be sent through a specific path, scheduler module 80 determines which of the specific packets in send buffer 61 are to be sent through each of the paths, by binding the packets accordingly.

Thus, to determine which of the specific packets in send buffer 61 are to be sent through each of the paths, consider the case in which a path engine 50 instance corresponding to path j sends a path header with path sequence number s at time T. Scheduler module 80 receives the path header through a send_data( ) call and determines the rank of the corresponding packet from the rank data structure.

The rank of a packet is determined by counting the number of entries with values less than $T + RTT_j/2$ in the rank data structure 86. Scheduler module 80 finds the packet with connection sequence number i as the $k_{th}$ packet to send in the pending data structure 90.

As discussed above, pending data structure 90 may include the connection sequence numbers of packets yet to be transmitted or retransmitted. After finding the specific packet in pending data structure 90, scheduler 80 updates the entry for the packet i in the binding data structure 82 with (j/s) and inserts an entry (i, T+3/2*RTT$_j$) in rank data structure 86. Finally, scheduler 80 uses the sequence number i from the connection header, attaches the connection header and the received path header to the data packet and sends it to the IP layer through parallel communication sender 64. When an ACK packet is received, the corresponding entry in the rank data structure 86 is deleted.

The reliable delivery of packets within a connection may also be handled by the scheduler module 80. Specifically, scheduler module 80 may transmit packets from the send buffer based on a scheduling policy, as discussed above. Furthermore, scheduler module 80 may delete packets for which an ACK has arrived (indicating the successful receipt of the packet at the destination parallel communication transceiver).

Thus, in contrast to path reliability (handled by reliability module 54 in path engine 50), the reliable delivery of packets through the connection may be ensured by scheduler module 80 of core engine 48. Said another way, irrespective of the specific path a packet takes to the receiving parallel communication transceiver, the core engine 48 of the sending parallel transceiver may be configured to assume the responsibility of the reliable delivery of the data packet over the connection.

Now that path engine 48 and core engine 50 have been described, a number of exemplary features which may be exploited with the described systems and methods are described. For example, a dynamic reassignment feature may be may be used to prevent the loss of packets due to the incorrect estimation of capacity of any path by the corresponding path engine. For example, it is possible for path characterization module 52 to over-estimate the capacity of the path, for example, just before congestion occurs in the path. This overestimation may result in an undesirable slow down of data in paths where the congestion window has been recently reduced.

For example, the congestion window of path pi may be represented as cwndi. If cwndi worth of data is assigned to path pi, and the congestion window size is cut down to cwndi/2 worth of data that falls outside the congestion window of pi, the transmission of data will be blocked until congestion window cwndi opens up. Accordingly, the transmission in other paths may slow down because of the delay in the delivery of packets in path pi.

However, by leveraging the decoupling that exists between path congestion control and connection reliability, this problem may be alleviated. Specifically, when a path experiences congestion, path characterization module 52 of the path engine 50 may reduce the congestion window (e.g. by half, if it is detected by duplicate acknowledgments and to one if there is a timeout).

As discussed earlier, if path characterization module 52 for the corresponding path reduces the congestion window, the path characterization module 52 may inform the scheduler module 80 about the reduction. Scheduler module 80 may then unbind the data packets bound to the sequence numbers of the concerned path that fall outside the congestion window.

Thus if another path has space in its congestion window and sends send_data( ) calls, the unbound data may be reassigned to that path. When the original path calls send_data( ) after recovering from congestion, scheduler module 80 may bind new data packets stored in the send buffer to the path headers sent by the path engine 50. Accordingly, this dynamic reassignment algorithm may be used to improve the performance of parallel communication to alleviate problems introduced by changing network conditions of the individual paths.

Another exemplary feature which may be exploited with the described systems and methods may be referred to as redundant striping. While the dynamic reassignment strategy describe above reassigns packets that fall out of the congestion window of a particular path, the dynamic reassignment strategy may not deal effectively with the first packet that may not fall out of the congestion window, irrespective of the state of the path.

Unfortunately, the failure to deliver the first packet through the path may potentially stall the data flow through the aggregate connection because the packets will not arrive in a sequenced delivery. This is possible, for example, if the concerned path is affected by a number of multiple timeouts or a complete stoppage of data flow through the respective path.

Fortunately, by using a redundant striping policy, these problems may be alleviated. Specifically, according to one embodiment of a redundant striping policy, scheduler module 80 may be configured to redundantly stripe, onto another path, the first data packet in the congestion window of a path that has suffered a timeout. Accordingly, the binding of the data packet is changed to the new path (although the old path also has been assigned the data packet for transmission). By leaving a copy of the data packet in the old path (e.g. instead of a simple reassignment), the old path will require at least one packet to send in order to recover from the timeout.

Embodiments have been described in which all, or nearly all, of the intelligence (e.g. availability of resources, characterization of resources, the objective functionalities, etc.) resides within the sending parallel communications transceiver. However, a substantial portion of the intelligence may be distributed to a receiving parallel communications transceiver or within any intermediate nodes. For example, an intermediate network resource (e.g. a node, a legacy router, or another parallel communications transceiver) along a path may supply information about other network resources the node is aware of that may be used to directly or indirectly determine path characteristics. Additionally, a receiving parallel communications transceiver may perform the tasks of path discovery and path characterization, and the sending parallel communications transceiver may periodically request the information to provide the scheduler module with the necessary information from the receiving parallel communications transceiver to effectively transmit data over the provided paths to meet the desired objectives. Accordingly, the required computing power and footprint for the implementation may be distributed across the entire network.

Although FIG. 1 depicted two sets of parallel communication transceivers, connections, and endpoints, any number of communication transceivers may be interfaced to network 26 for the purpose of leveraging network 26 for an associated communications endpoint. For example, as depicted in FIG. 3, a network such as corporate WAN 100 may be represented by four remote office sites 102, 104, 106, and 108, located in San Francisco, Atlanta, Chicago, and Seattle, respectively.

Each of the four remote office sites 102, 104, 106, and 108 may include a parallel communication transceiver 110, 112, 114, and 116, respectively. Additionally, each of the four remote office sites 102, 104, 106, and 108 may include one or more sub-networks 118, 120, 122, and 124 (e.g. LANs or WANs) for connecting a number of communications endpoints (not depicted).

Each of the parallel communication transceivers 110, 112, 114, and 116 for the respective sites, may have a direct connection to the other sites, represented by communication links 126, 128, 130, 132, 134 and 136. Each of communication links 126-136 may represent end-to-end communication connections between each of transceivers 110, 112, 114, and 116, which may comprise any number of network resources which have been leveraged according to the embodiments described with respect to FIGS. 1 and 2.

Figure 3:
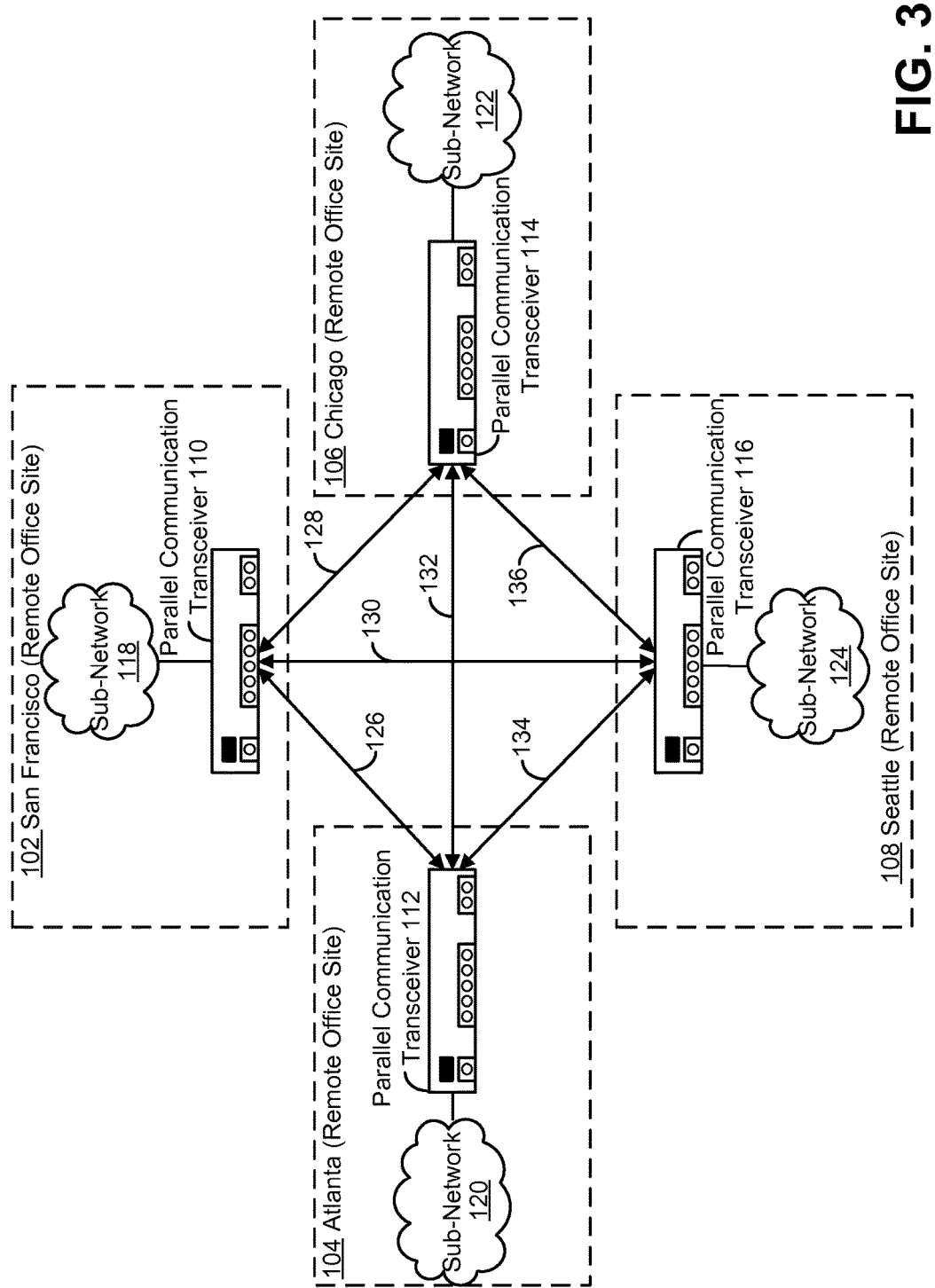
FIG. 3 depicts an embodiment of a corporate WAN spanning a plurality of remote office sites having a plurality of the parallel networking transceivers, as depicted in FIG. 2, for leveraging a plurality of parallel communication paths.
Figure 4:
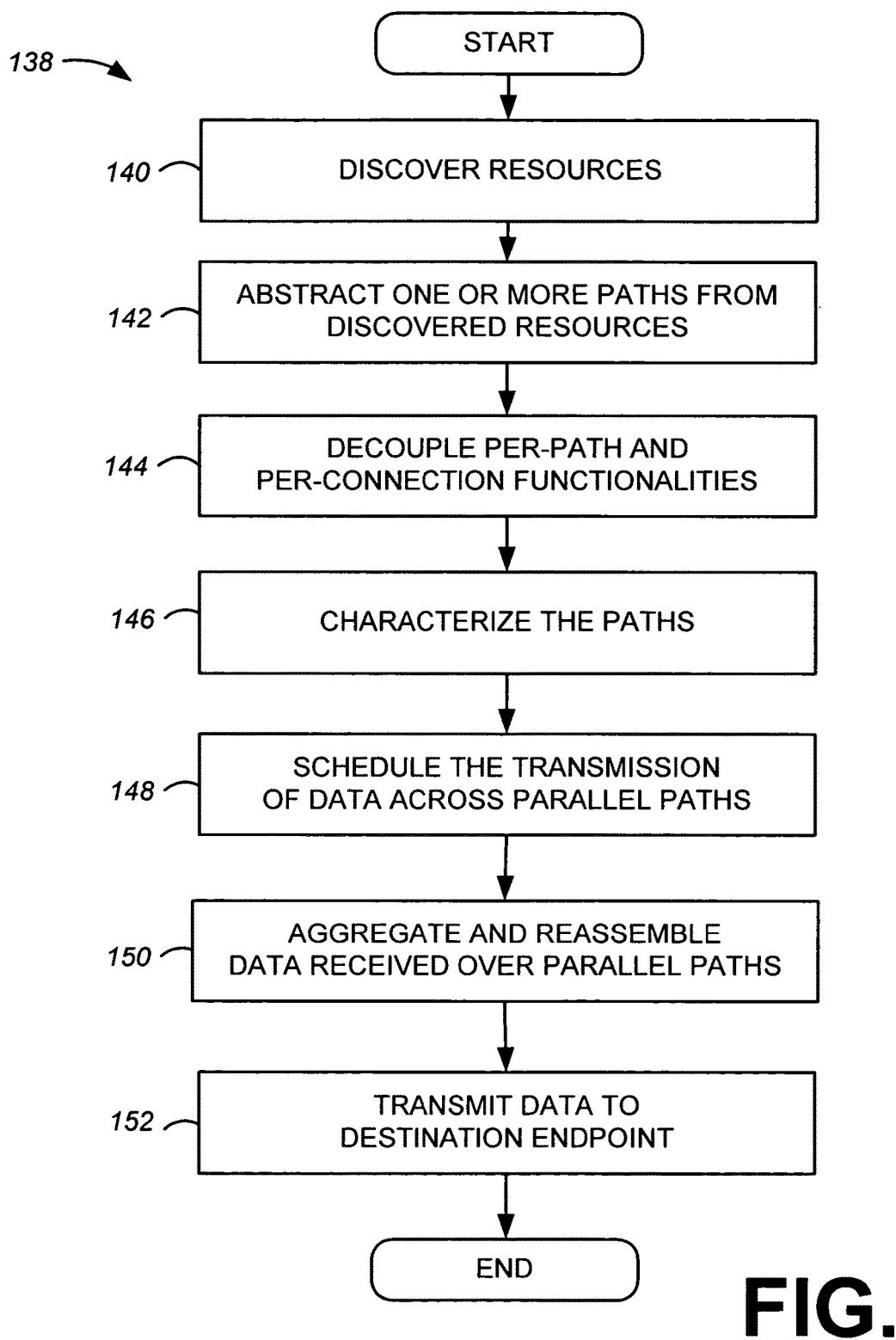
FIG. 4 depicts an embodiment of an exemplary method including steps for communicating data over a plurality of parallel communication paths.

In the example of FIG. 3, existing network management techniques, which do not aggregate network resources, lack the ability to dynamically alter the topology of a network to cater to specific traffic needs. For example, consider the case in which the systems and methods of the described embodiments are not used, and the peak bandwidth usage rate between any two of the sites is 100 Mbps. Without the parallel communication transceiver 110, 112, 114, and 116, links 126-136 must be provisioned with a bandwidth of 100 Mbps between each site to meet the peak bandwidth requirements.

In contrast, by installing parallel communication transceivers 110, 112, 114, and 116 at each remote site, the ability to leverage each of the paths between the sites is realized. Thus, in the above example, for a fully connected network topology, it is sufficient to provision a site-to site link with a bandwidth of 33.3 Mbps since there are at least three parallel connections between any two sites.

Accordingly, the exemplary corporate WAN 100 illustrates that a plurality of single virtual connections may be further leveraged by further abstracting the individual links that comprise up a number of paths between parallel communication transceivers 110, 112, 114, and 116 into a new single connection. For example, the paths formed by links 126 and 128; 132; and 134 and 136, form three paths of which may be abstracted into a single virtual connection between parallel communication transceivers 112 and 114. It should be understood that other paths may also be available as well, such as the path formed by links 126, 130, 136 and/or 134, 130, and 128.

The example of corporate WAN 100 illustrates that intermediate parallel communication transceivers, which may have been discovered by resource discovery module 79 (FIG. 2), may be particularly valuable in that the intermediate parallel communication transceiver may be instructed to retransmit packets along any of the known potential abstracted paths by the sending transceiver. These intermediate parallel communication transceivers may be described as "reflection points" along an abstracted path. For example, in transmitting data from transceiver 112 to transceiver 114, intermediate transceivers 110 and 116 may be instructed to communicate data either directly to transceiver 114, or through other intermediate transceivers (e.g. sequentially along paths 126, 130, and 136 and through intermediate transceivers 110 and 116). This route instruction may, for example, be included in the parallel communication header.

A sending parallel communication transceiver may instruct (e.g. using IP-in-IP encapsulation, minimal IP encapsulation, or source routing) an intermediate parallel communication transceiver to direct packets to other known parallel communication transceivers, which may be other intermediate or destination parallel communication transceivers.

Embodiments of parallel communication have been generally described as having both a sending and receiving parallel communication transceiver. However, in some embodiments, it is not necessary that data delivered to a receiving node be received by a parallel communication transceiver. Rather, a sending parallel communication transceiver may schedule the transmission of data to be received at the receiving node over a plurality of paths to meet an objective function, where the receiving node is the destination endpoint, itself. In such an embodiment, the path properties may be learned by the sending parallel communication transceiver through external means (e.g. through external configuration) as the sending parallel communication transceiver may not be able to cooperate with the destination endpoint in its resource characterization methods.

Embodiments of the described parallel communication may be described as methods for communicating data over parallel data paths, and the functions of the described systems may be viewed as providing a number of steps that may be performed to effectively communicate data over parallel data paths.

However, specifically, one such parallel communication method 138 may include a step 140 of discovering resources available to transmit data across network 26. For example, the resources may be a variety of network entities such as nodes, legacy routers, or parallel communication transceivers which may form a path. The discovery step 140 may include broadcasting a data packet comprising a request for a receiving node to transmit an acknowledgment packet, and receiving an acknowledgement packet from a receiving node, which may be a parallel communication transceiver. Resources may also be discovered by the resource information being provided from an external source (e.g. transmitted from a network resource or through other external configuration). Resources may further be discovered by monitoring data traffic to discover sending and receiving nodes, which may be parallel communication transceivers.

Upon the discovery of resources, these known resources may be maintained by repeatedly transmitting packets to the known resources. Accordingly, the availability of the known parallel transceivers to receive the transmission of data may be maintained. The repeated transmissions may occur continuously, periodically, or randomly at any time interval.

Step 142 may include collecting route information from a received data packet and abstracting at least one path between a sending node and the receiving node from the extracted route information. A plurality of abstracted parallel data paths may define a single virtual connection between a sending node and receiving node. Intermediate parallel communication transceivers may be instructed to direct data packets to other known parallel communication transceivers along the path using a routing standard such as IP-in-IP encapsulation, minimal IP encapsulation, or source routing.

Step 144 may include decoupling network functionalities into per-path functionalities and per-connection functionalities. The per-path functionalities may include the estimation of an available rate, an estimation of delay, an estimation of loss, and congestion control, and the per-connection functionalities may include flow control, connection management, and connection reliability. The decoupling may also include creating a session based on a trigger, the session including a core engine for maintaining the per-path functionalities and at least one path engine for maintaining the per-path functionalities. A data structure may be maintained for each path and connection.

Step 146 may include characterizing each of a plurality of parallel data paths by repeatedly determining path properties. Specifically, the path properties may be a measurement of any one of the instantaneous, mean, and distribution of the bandwidth, delay, jitter, loss rate, cost, and security, for data transmitted over a particular path.

Step 148 may include scheduling the transmission of data across the plurality of parallel data paths to meet an objective function, and this scheduling may based on the path properties, a higher layer protocol, or a specific application. The objective function may include providing the connection with a level of: bandwidth, delay, jitter, loss rate, security, resilience, or cost.

The scheduling step may also include predicting the arrival time and/or arrival probability of data to be transmitted over each of the plurality of parallel data communication paths, and then synchronizing the arrival time of data at the receiving node within a predetermined degree of synchronization. For example, the scheduling step may include scheduling the transmission of data along a first path of the plurality of parallel data communication paths to be received at the destination. The scheduling step may also include scheduling a second transmission of data along the second path of the plurality of parallel data communication paths. The second transmission of data may be scheduled to be received at the receiving node in a predetermined sequence in relation to the first packet.

At step 150, the data transmitted over the parallel paths may be, at a receiving node, for example, be aggregated and reassembled to form the original data communication. For example, a received first and second transmission of data may be reassembled only upon: receiving the first and second transmissions out of the predetermined sequence; and determining that a higher layer protocol requires the first and second transmissions be delivered in the predetermined sequence.

At step 152, the received (and potentially reassembled) data may then be transmitted to the destination endpoint.

Embodiments of the described parallel communication systems and methods may be deployed in a number of ways. For example, systems and methods may be implemented as a user-space library on a client and the server, kernel-space software on the endpoint client and server, as a stand-alone network element, or as an embedded network element.

The parallel communication system embodiment of FIGS. 1-3 are examples of an implementation within parallel communication transceivers comprising stand-alone network elements. This deployment of the described parallel communication system may be advantageous in that it does not require changes to the communications endpoints or the legacy network infrastructure (except to physically insert the stand-alone network elements on either side of the network resources to be leveraged). The systems and methods leverage the multiplicity of paths existing between the communications endpoints having intermediate parallel communication transceivers. Due to the capability of the parallel communication transceiver to aggregate resources, and to provide the abstraction of a single resource to the applications executed at each endpoint, existing network elements are not required to be reconfigured or be aware of the presence of the parallel communication transceivers.

The described systems and methods are agnostic to the specific network technology used and do not require changes to existing network applications that are in place. The systems and methods may dynamically characterize the degree of parallelism possible in a given network setting, and delivers parallelized performance to applications using the network. The systems and methods are capable of adapting to defined objective functions, and include flexible deployment strategies ranging from simple software downloads on end-systems in a network to being fully integrated with the network elements themselves.

It should be emphasized that many variations and modifications may be made to the above-described embodiments. All such modifications and variations are intended to be included herein within the scope of this disclosure and protected by the following claims.

What is claimed is:

1. A method for communicating data over parallel data paths comprising:
   characterizing each of a plurality of parallel data paths by repeatedly determining path properties, the plurality of parallel data paths defining a single virtual connection between a sending node and receiving node, wherein at least one of the plurality of parallel data paths comprises a plurality of intermediate nodes; and
   scheduling the transmission of data across the plurality of parallel data paths to meet an objective function, the scheduling based on the path properties.

2. The method of claim 1, wherein the step of scheduling the transmission data further includes:
   scheduling a first transmission of data along a first path of the plurality of parallel data communication paths to be received at the receiving node; and
   scheduling a second transmission of data along a second path of the plurality of parallel data communication paths, the second transmission of data scheduled to be received at the receiving node in a predetermined sequence in relation to a first packet.

3. The method of claim 1, further including:
   reassembling the received first and second transmissions of data at the receiving node only upon: receiving the first and second transmissions out of the predetermined sequence; and
   determining that a higher layer protocol requires the first and second transmissions be delivered in the predetermined sequence.

4. The method of claim 1, further including:
   predicting an arrival time of data to be transmitted over each of the plurality of parallel data communication paths.

5. The method of claim 4, further including:
   predicting the arrival probability of data to be transmitted over each of the plurality of parallel data communication paths.

6. The method of claim 4, further including:
   synchronizing the arrival time of data at the receiving node within a predetermined degree of synchronization.

7. The method of claim 1, further including:
   broadcasting a data packet comprising a request for a receiving parallel communication transceiver to transmit an acknowledgment packet; and
   receiving an acknowledgement packet from the receiving parallel communication transceiver.

8. The method of claim 7, further including:
   abstracting at least one path to the receiving parallel communication transceiver.

9. The method of claim 1, further including:
   monitoring data traffic to discover a sending parallel communication transceiver and a receiving parallel communication transceiver; and
   abstracting at least one path between the sending parallel communication transceiver and the receiving parallel communication transceiver.

10. The method of claim 1, further including:
    decoupling network functionalities into per-path functionalities and per-connection functionalities.

11. The method of claim 10, further including:
creating a session based on a trigger, the session including a core engine for maintaining the per-path functionalities and at least one path engine for maintaining the per-path functionalities.

12. The method of claim 10, further including:
maintaining a data structure for each of the plurality of parallel data paths.

13. The method of claim 10, wherein the per-path functionalities are selected from the group consisting of:
the estimation of an available rate, an estimation of delay, an estimation of loss, and congestion control.

14. The method of claim 10, wherein the per-connection functionalities are selected from the group consisting of:
flow control, connection management, and connection reliability.

15. The method of claim 1, wherein the objective function is providing the virtual connection with one or more levels of:
throughput, bandwidth, delay, jitter, loss rate, security, reliability, resilience, or cost.

16. The method of claim 1, wherein the path properties are a measurement of one or more of the instantaneous, mean, and distribution of the throughput, bandwidth, delay, jitter, loss rate, cost, security, reliability, resilience, or cost for data transmitted over a particular path.

17. The method of claim 1, wherein the step of scheduling is further based on an awareness of a higher layer network protocol or an application.

18. The method of claim 1, further including:
repeatedly transmitting packets to a plurality of known parallel communication transceivers for determining an availability of the known parallel communication transceivers to receive the transmission of the data.

19. The method of claim 1, further including:
instructing an intermediate parallel communication transceiver to direct data packets to other known parallel communication transceivers using a routing standard selected from the group consisting of:
IP-in-IP encapsulation, minimal IP encapsulation, and source routing.

20. The method of claim 1, wherein the step of scheduling the transmission of data across the plurality of parallel data paths further includes:
scheduling the data for transmission to the receiving node, the receiving node selected from the group consisting of: a parallel communication transceiver and a destination endpoint.

21. The method of claim 1, wherein characterizing each of a plurality of parallel data paths further comprises adding a header to a packet, wherein the header comprises information used to deductively determine the path properties.

22. The method of claim 1, wherein in scheduling the transmission of data across the plurality of parallel data paths is based on the path properties to minimize out of order receipt.

23. A system for communicating data over parallel data paths comprising:
a processor configured to fetch and execute instructions from an instruction execution system, the instructions comprising: instructions for characterizing each of a plurality of parallel data paths by repeatedly determining path properties, the plurality of parallel data paths defining a single virtual connection between a sending node and receiving node, wherein at least one of the plurality of parallel data paths comprises a plurality of intermediate nodes; and
a memory, coupled to the processor, having instructions, embodied thereon for scheduling the transmission of data across the plurality of parallel data paths to meet an objective function, the scheduling based on the path properties, the instructions for scheduling the transmission of data further including:
instructions, embodied on the memory, for scheduling a first transmission of data along a first path of the plurality of parallel data communication paths to be received at the receiving node; and
instructions, embodied on the memory, for scheduling a second transmission of data along a second path of the plurality of parallel data communication paths, the second transmission of data scheduled to be received at the receiving node in a predetermined sequence in relation to a first packet.

24. The system of claim 23, the instructions further including:
instructions, embodied on the memory, for reassembling the received first and second transmissions of data at the receiving node only upon:
receiving the first and second transmissions out of the predetermined sequence; and
determining that a higher layer protocol requires the first and second transmissions be delivered in the predetermined sequence.

25. The system of claim 23, the instructions further including:
instructions, embodied on the memory, for predicting an arrival time of data to be transmitted over each of the plurality of parallel data communication paths.

26. The system of claim 25, the instructions further including:
instructions, embodied on the memory, for predicting the arrival probability of data to be transmitted over each of the plurality of parallel data communication paths.

27. The system of claim 25, the instructions further including:
instructions, embodied on the memory, for synchronizing the arrival time of data at the receiving node within a predetermined degree of synchronization.

28. The system of claim 23, the instructions further including:
instructions, embodied on the memory, for broadcasting a data packet comprising a request for a receiving parallel communication transceiver to transmit an acknowledgment packet; and
instructions, embodied on the memory, for receiving an acknowledgement packet from the receiving parallel communication transceiver.

29. The system of claim 28, the instructions further including:
instructions, embodied on the memory, for abstracting at least one path to the receiving parallel communication transceiver.

30. The system of claim 23, the instructions further including:
instructions, embodied on the memory, for monitoring data traffic to discover a sending parallel communication transceiver and a receiving parallel communication transceiver; and
instructions, embodied on the memory, for abstracting at least one path between the sending parallel communication transceiver and the receiving parallel communication transceiver.

31. The system of claim 23, the instructions further including:

instructions, embodied on the memory, for decoupling network functionalities into per-path functionalities and per-connection functionalities.

32. The system of claim 31, the instructions further including:
instructions, embodied on the memory, for creating a session based on a trigger, the session including a core engine for maintaining the per-path functionalities and at least one path engine for maintaining the per-path functionalities.

33. The system of claim 31, the instructions further including:
instructions, embodied on the memory, for maintaining a data structure for each of the plurality of parallel data paths.

34. The system of claim 23, wherein the instructions for scheduling the transmission of data across the plurality of parallel data paths are further based on an awareness of a higher layer network protocol or an application.

35. The system of claim 23, the instructions further including:
instructions, embodied on the memory, for repeatedly transmitting packets to a plurality of known parallel communication transceivers for determining an availability of the known parallel communication transceivers to receive the transmission of the data.

36. The system of claim 23, the instructions further including:
instructions, embodied on the memory, for directing data packets to other known parallel communication transceivers using a routing standard selected from the group consisting of:
IP-in-IP encapsulation, minimal IP encapsulation, and source routing.

37. The system of claim 23, wherein the instructions for scheduling the transmission of data across the plurality of parallel data paths further includes:
instructions, embodied on the memory, for scheduling the data for transmission to the receiving node, the receiving node selected from the group consisting of:
a parallel communication transceiver and a destination endpoint.

38. A method for communicating data over parallel data paths comprising:
characterizing each of a plurality of parallel data paths by repeatedly determining path properties, the plurality of parallel data paths defining a single virtual connection between a sending node and receiving node, wherein at least one of the plurality of parallel data paths comprises a plurality of intermediate nodes; and
scheduling the transmission of data across the plurality of parallel data paths to meet an objective function, the scheduling based on the path properties, wherein the objective function is providing the virtual connection with one or more levels of bandwidth, delay or loss rate.

* * * * *